US012773990B2

(12) United States Patent

Roesler et al.

(10) Patent No.: US 12,773,990 B2
(45) Date of Patent: Oct. 27, 2026

(54) METHOD OF MAINTAINING LATERAL POSITION OF A VEHICLE ON A ROADWAY, METHOD OF CONFIGURING A ROADWAY FOR LATERAL POSITION SENSING, AND PAVING MATERIAL PRODUCT

(71) Applicant: The Board of Trustees of the University of Illinois, Urbana, IL (US)

(72) Inventors: Jeffery R. Roesler, Champaign, IL (US); Sachindra Dahal, San Francisco, CA (US)

(73) Assignee: THE BOARD OF TRUSTEES OF THE UNIVERSITY OF, Illinois Urbana, IL (US)

( * ) Notice: Subject to any disclaimer, the term of this patent is extended or adjusted under 35 U.S.C. 154(b) by 261 days.

(21) Appl. No.: 18/368,866

(22) Filed: Sep. 15, 2023

(65) Prior Publication Data

US 2024/0101109 A1 Mar. 28, 2024

Related U.S. Application Data

(60) Provisional application No. 63/410,928, filed on Sep. 28, 2022.

(51) Int. Cl.
*B60W 30/12* (2020.01)

(52) U.S. Cl.
CPC ......... *B60W 30/12* (2013.01); *B60W 2420/50* (2013.01); *B60W 2552/53* (2020.02)

(58) Field of Classification Search
None
See application file for complete search history.

(56) References Cited

U.S. PATENT DOCUMENTS

| | | | | |
|---|---|---|---|---|
| 5,781,119 A * | 7/1998 | Yamashita | ............... | G08G 1/22<br>340/905 |
| 2003/0123930 A1* | 7/2003 | Jacobs | .................... | E01F 9/512<br>404/12 |
| 2004/0074685 A1* | 4/2004 | Tham | ..................... | G01D 5/145<br>180/168 |

(Continued)

FOREIGN PATENT DOCUMENTS

JP 2001273033 A * 10/2001

OTHER PUBLICATIONS

Machine translation of JP-2001273033-A (Year: 2025).*

(Continued)

*Primary Examiner* — Jennifer M Anda
(74) *Attorney, Agent, or Firm* — Crowell & Moring LLP

(57) ABSTRACT

A method of maintaining lateral lane position of a vehicle traveling on a roadway includes detecting a magnetic field from a surface of the roadway, where the surface includes a magnetic or magnetized material, and adjusting a lateral position of the vehicle on the roadway such that the magnetic field has a maximum signal at a predetermined location on the vehicle, e.g., at or near a centerline of the vehicle. The magnetic or magnetized material may be localized to a longitudinal segment of the surface approximately centered between lane lines or at another desired location. Detection of the magnetic field may take place continuously while the vehicle is moving.

11 Claims, 8 Drawing Sheets

(56) References Cited

U.S. PATENT DOCUMENTS

| | | | | |
|---|---|---|---|---|
| 2008/0189038 A1* | 8/2008 | Hole | G05D 1/0261 | |
| | | | 701/300 | |
| 2015/0247719 A1* | 9/2015 | Huang | B62D 15/025 | |
| | | | 701/41 | |
| 2016/0082957 A1* | 3/2016 | Zsombory | G08G 1/167 | |
| | | | 701/1 | |
| 2019/0031076 A1* | 1/2019 | Yamamoto | G05D 1/021 | |
| 2021/0150905 A1* | 5/2021 | Yamamoto | G05D 1/0261 | |
| 2021/0402988 A1* | 12/2021 | Zhang | B60W 30/06 | |
| 2023/0205225 A1* | 6/2023 | Leefer | B60W 30/09 | |
| | | | 180/168 | |

OTHER PUBLICATIONS

A. Anguelouch, A. Gupta and G. Xiao, "Thickness dependence of magnetic and transport properties of chromium dioxide (CrO/sub 2/) strained epitaxial thin films," in IEEE Transactions on Magnetics, vol. 37, No. 4, pp. 2135-2137, Jul. 2001, doi: 10.1109/20.951100. (Year: 2001).*

Bar Hillel et al., "Recent Progress in Road and Lane Detection: a Survey," *Machine Vision and Applications*, 25(3), (2014), pp. 727-745.

Basile et al., "A New Stabilization Process for $CrO_2$ Powders," *Materials Research Magnetic materials*, 17(19), (1982), pp. 1197-1202.

Bate, G., "Magnetic Recording Materials Since 1975," *Journal of Magnetism and Magnetic materials*, 100(1-3), (1991), pp. 413-424.

Borkar et al., "A Novel Lane Detection System with Efficient Ground Truth Generation," *IEEE Transactions on Intelligent Transportation Systems*, 13(1), (2012), pp. 365-374.

Chamberland, B. L. "The Chemical and Physical Properties of $CrO_2$ and Tetravalent Chromium Oxide Derivatives," *Critical Reviews in Solid State and Material Sciences*, 7(1), (1977), pp. 1-31.

Chan, C. Y. and Tan, H-S. "Evaluation of Magnetic Markers as a Position Reference System for Ground Vehicle Guidance and Control," *California PATH Research Report*, UCB-ITS-PRR-2003-8 (2003), pp. 1-27.

Chan, C. Y. "A system review of magnetic sensing system for ground vehicle control and guidance," *California PATH Research Report*, UCB-ITS-PRR-2002-20 (2002) pp. 1-88.

Chan, C. Y., "Magnetic sensing as a position reference system for ground vehicle Control," *IEEE Transactions on Instrumentation and Measurement*, 51(1), (2002), pp. 43-52.

Dahal, S. et al., "Infrastructure Enhancements for CAV Navigation," *Center for Connected and Automated Transportation, Report No. ICT-20-008*, (2018), pp. 1-36.

Dahal, S. and Roesler, J., "Passive Electromagnetic Signature of Roadway for Vehicle Lateral Positioning," *CCAT and ITS Michigan Annual Student Poster Competition*, (Apr. 13, 2021) 2 pp.

Dahal, S. and Roesler, J., "Passive Sensing of Conductive Concrete for Vehicle Lateral Positioning," *CCAT and ITS Michigan Annual Student Poster Competition*, (2020) 1 p.

Darnell, F. J., "Magnetization Process in Small Particles of $CrO_2$," *Journal of Applied Physics*, 32(7), (1961), pp. 1269-1274.

Kim, Z., "Robust Lane Detection and Tracking in Challenging Scenarios," *IEEE Transactions on Intelligent Transportation Systems*, 9(1) 107, (2008), pp. 16-26.

Kryder, M. H. et al., "Heat Assisted Magnetic Recording," *Proceedings of the IEEE*, 96(11), (2008), pp. 1810-1835.

McCall et al., "Video-Based Lane Estimation and Tracking for Driver Assistance: Survey, System, and Evaluation," *IEEE transactions on Intelligent Transportation systems*, 7(1), (2006), pp. 20-37.

Moreno-Navarro et al., "Encoded Asphalt Materials for the Guidance of Autonomous Vehicles," *Automation in Construction* 99 (2019), pp. 109-113.

Ranjan et al., "Magnetic Properties of Decarburized Steels: an Investigation of the Effects of Grain Size and Carbon Content," *IEEE Transactions on Magnetics*, 23(3), (1987), pp. 1869-1876.

Ripka, P. "Advances in Fluxgate Sensors," *Sensors and Actuators A: Physical*, 106(1-3), (2003), pp. 8-14.

Yurtsever et al., "A Survey of Autonomous Driving: Common Practices and Emerging Technologies," *IEEE Access*, 8, (2020), pp. 58443-58469.

* cited by examiner

METHOD OF MAINTAINING LATERAL POSITION OF A VEHICLE ON A ROADWAY, METHOD OF CONFIGURING A ROADWAY FOR LATERAL POSITION SENSING, AND PAVING MATERIAL PRODUCT

RELATED APPLICATION

The present patent document claims the benefit of priority under 35 U.S.C. 119(e) to U.S. Provisional Patent Application No. 63/410,928, which was filed on Sep. 28, 2022, and is hereby incorporated by reference in its entirety.

STATEMENT OF FEDERALLY SPONSORED RESEARCH OR DEVELOPMENT

This invention was made with government support under 69A3551747105 awarded by the U.S. Department of Transportation. The government has certain rights in the invention.

TECHNICAL FIELD

The present disclosure relates generally to autonomous vehicle and driver assistance technologies, and more specifically to detection of magnetic roadway signals to maintain lateral position of a vehicle on a roadway and/or warn driver/vehicle of lane departure.

BACKGROUND

Autonomous vehicles (AV) and advanced driver-assistance systems (ADAS) rely on sensors to offer multiple safety benefits for drivers and road agencies. As a result, the number of cars using sensors to enhance driving safety has increased rapidly and continues to rise. Determining the lateral position of a vehicle within the lane ("lane keeping") or warning of imminent lane departure has emerged as a safety-critical application. However, maintaining the lateral position of the vehicle between lane lines over a wide range of conditions is a challenge, particularly in adverse weather conditions when lane markings are occluded, or even in good weather when lane markings are not readily seen or are not present. For large scale adaptation of ADAS/AVs without compromising safety, vehicle-to-infrastructure sensing capabilities are desired for redundancy, especially during severe weather conditions.

DETAILED DESCRIPTION

Figure 1A:
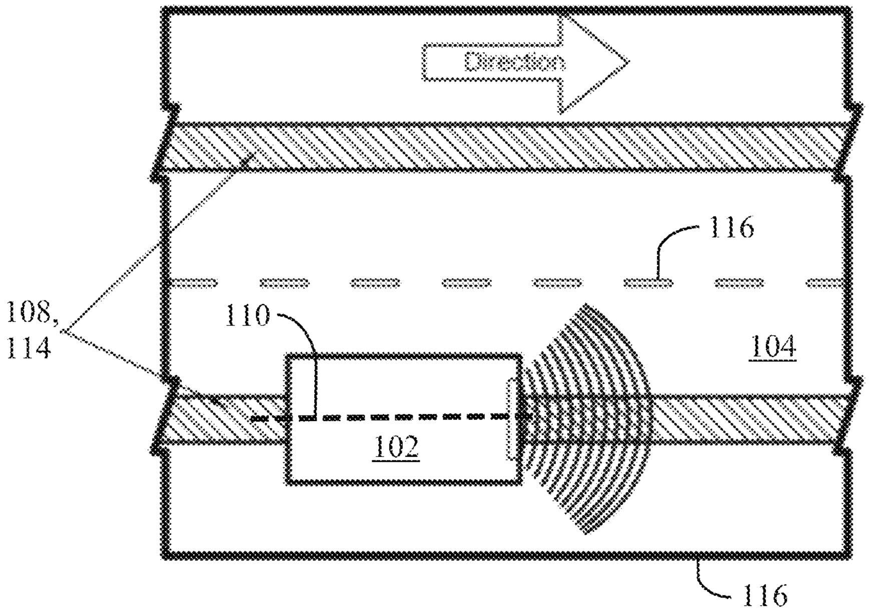
FIG. 1A is a top-view schematic of a vehicle traveling on a roadway while exploiting magnetic field detection to maintain lateral lane position; more specifically, the magnetic field from a magnetic or magnetized material localized to a longitudinal segment of the surface of the roadway is continuously detected.
Figure 1B:
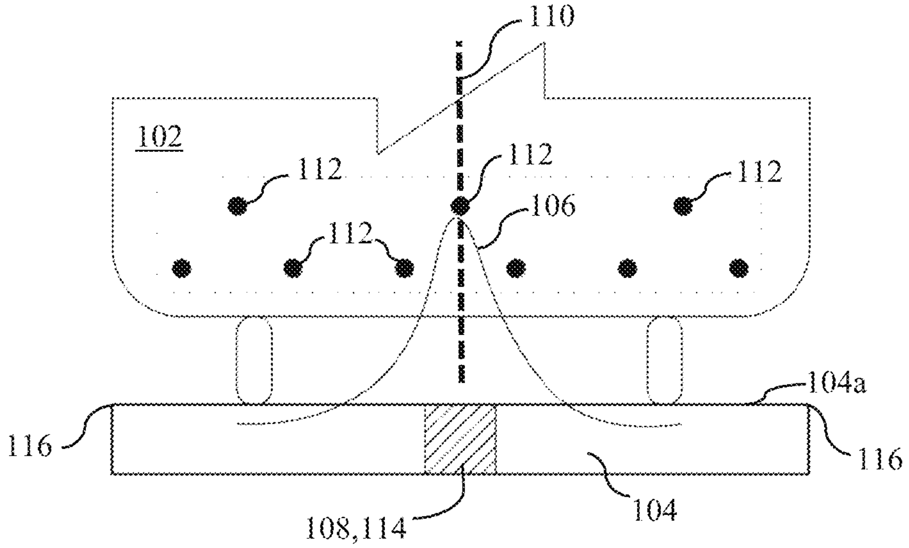
FIG. 1B is a cross-sectional schematic of the vehicle of FIG. 1A showing nine magnetometers mounted on a front bumper of the vehicle for magnetic field detection.

Referring to FIGS. 1A and 1B, a method of maintaining lateral lane position of a vehicle 102 traveling on a roadway 104 is described, where a surface 104*a* of the roadway 104 includes a magnetic or magnetized material 108. The method includes detecting a magnetic field 106 from the surface 104*a* and adjusting a lateral position of the vehicle 102 on the roadway 104 such that the detected magnetic field 106 has a maximum signal at a predetermined location on the vehicle 102, e.g., at or near a centerline 110 of the vehicle 102, as shown in FIG. 1B. In this situation, if the detected magnetic field 106 has a maximum signal 30 cm to the right of the centerline 110 of the vehicle 102, then the lateral position of the vehicle may be adjusted by approximately 30 cm to the right to align the vehicle 102 with the centerline 110. If, on the other hand, the detected magnetic field 106 has a maximum at or near the centerline 110, that is, within about 5 cm from the centerline 110, then the lateral position of the vehicle may not be adjusted (or may be adjusted by 0-5 cm). Detection of the magnetic field 106 may be carried out using an arrangement of magnetometers 112, sensors that measure the strength and direction of magnetic fields. The vehicle 102 may be an autonomous vehicle or may be configured with advanced driver assistance technologies (ADAS), e.g., lane keeping, blind spot monitoring, adaptive cruise control. Advantageously, the method may be utilized even under adverse weather conditions, e.g., when the roadway 104 is partially or fully covered by water, snow, ice, sand, and/or mud or visibility of the roadway and lane markings is difficult as a result of fog, rain, dust or smoke.

The magnetic or magnetized material 108 may be localized to a longitudinal segment 114 of the surface 104*a* approximately centered between lane lines 116, or at another desired location on the roadway 104. Typically, the magnetic or magnetized material 108 has a morphology of particles, fibers, and/or ribbon(s), which may have linear dimensions (e.g., length, width, thickness, and/or diameter) ranging from the microscale to the milliscale, that is, from a few microns to tens of millimeters. The magnetic or magnetized material 108 may be embedded into and/or coated onto the surface 104*a* of the roadway 104, which may comprise asphalt, concrete, or another paving material. The term "embedded into" may be understood to mean incorporated into a top layer of the roadway (i.e., partial depth of the roadway) or throughout the entire depth of the roadway. Typically, the magnetic or magnetized material 108 has a concentration in the longitudinal segment 114 of at least about 0.25 vol. %, at least about 0.5 vol. %, at least about 1 vol. %, or at least about 3 vol. %, and/or as high as about 3 vol. %, as high as about 5 vol. %, as high as about 7 vol. %, or as high as about 10 vol. %, e.g., the concentration may lie in a range from about 1 vol. % to about 10 vol. %. Because the magnetic or magnetized material 108 is distributed throughout the length of the longitudinal segment 114, preferably uniformly, detection of the magnetic field 106 and subsequent adjustments of the lateral position of the vehicle 102 may take place continuously while the vehicle 102 is in motion. In some examples, a magnetizable material may be incorporated throughout the surface 104*a* of the roadway (e.g., via coating or embedding), and then, after construction, the magnetizable material may be magnetized and optionally de-magnetized (programmed and deprogrammed) and re-magnetized as described below.

Figure 2:
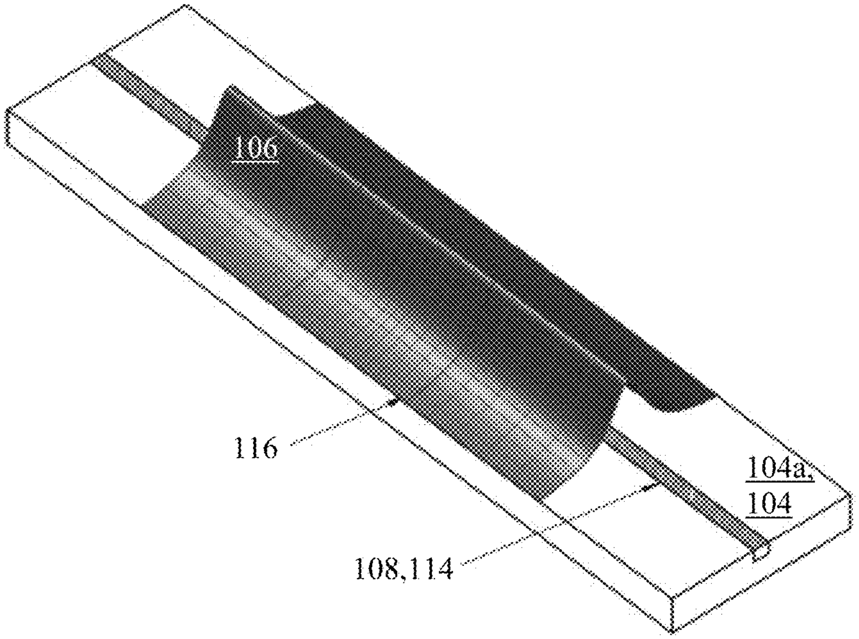
FIG. 2 is a schematic showing the magnetic signature, or magnetic field, created by the magnetic or magnetized material embedded into or coated onto the surface of the roadway, e.g., in or on a longitudinal segment roughly centered between lane lines.

When a magnetically permeable material (e.g., the magnetic or magnetized material 108) is incorporated into or onto the roadway 104, the magnetic flux from the earth's magnetic field is concentrated and a weak induced magnetic signature is created where the magnetically permeable material is localized. For example, a longitudinal segment 114 of approximately 3-30 cm in width and depth and containing a magnetic or magnetized material 108, as illustrated in FIG. 2, may draw the magnetic flux into that segment 114, creating a magnetic field 106 extending along the length of the longitudinal segment 114 that may be detected by magnetometers on a vehicle. The magnetic field strength may depend on the magnetic permeability of the magnetic or magnetized material 108, the shape of the longitudinal segment 114, the volume of roadway 104 modified, the concentration of magnetic or magnetized material 108 per unit volume, the morphology (e.g., spherical versus cylindrical) and/or size of the magnetic material 108 itself, and/or the distance between vehicle magnetometer(s) 112 and the magnetic or magnetized material.

As shown in FIG. 1B, detection of the magnetic field may utilize three or more magnetometers 112, which may be referred to as "the magnetometers," mounted on the vehicle 102. In one example, the magnetometers 112 may be mounted on a front bumper of the vehicle 102. In another example, the magnetometers 112 may be mounted on an undercarriage of the vehicle 102, and/or on a rear bumper of the vehicle 102. A suitable magnetic field detector can operate effectively from the height of the bumper or undercarriage of the vehicle with minimal signal interference. Advantageously, in contrast to eddy current sensors, magnetometers 112 detect only ferromagnetic materials such as iron, steel, cobalt, chromium oxide, etc., and are sensitive to electromagnetic (EM) materials even from relatively large distances. Radio waves, such as those produced by radar on the vehicle, do not interact with or alter magnetic fields, and thus radar devices do not interfere with magnetometer readings.

Figure 3:
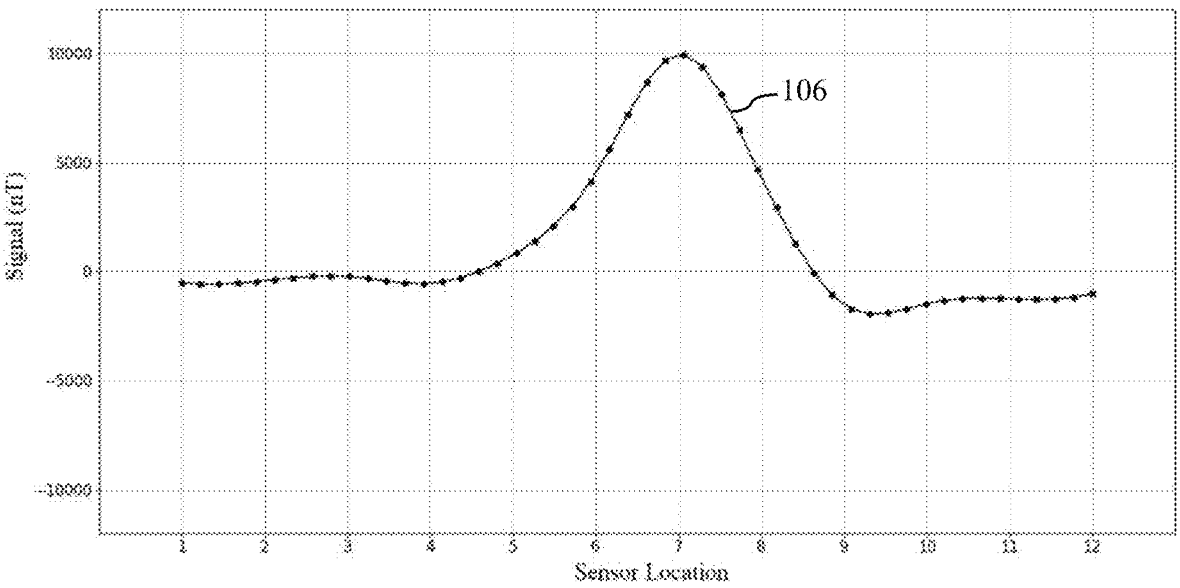
FIG. 3 shows magnetic field data obtained at locations of twelve (bottom) magnetometers mounted on a vehicle, minus background noise determined by four (top) magnetometers, and discretized into 50 points at a specific time during motion of the vehicle; the vehicle also includes four (top) magnetometers.

The magnetometers 112 may be positioned along a line or curve (e.g., of a bumper) which is transverse to the centerline 110 of the vehicle 102, as shown in FIG. 1B. An arrangement of magnetometers 112 at known positions on the vehicle 102 can be used to detect the magnetic signal from the longitudinal segment 114 in the roadway 104. Given that the longitudinal segment 114 typically spans 3-30 cm in width, an arrangement of magnetometers 112 that spans a meter or more may situate only one magnetometer 112, or only a few magnetometers 112, above or in the vicinity of the longitudinal segment 114 at a given time. The magnetometer 112 detecting the highest magnetic signal (maximum magnetic field) can be understood to be situated at or near the center of the lane (assuming the longitudinal segment 114 is approximately centered between lane lines). Using the data from the magnetometer 112 with the highest magnetic signal and its known position on the vehicle 102, the location of the centerline 110 of the vehicle 102 with respect to the location of the longitudinal segment 114, and thus the center of the lane, can be calculated, and needed adjustments in lateral positioning may be made. FIG. 3 shows magnetic field data obtained from twelve locations of magnetometers 112 mounted on a front bumper of a vehicle 102 as the vehicle 102 traverses an approximately 8 cm-wide longitudinal segment 114 including magnetic material 108. The magnetic field 106 detected by the sixteen magnetometers 112 of this example (twelve at bottom locations; four at top locations for background magnetic field reduction, see FIGS. 4A and 4B) was discretized into 50 data points at a specific time when the vehicle 102 was in motion. The centerline 110 of the vehicle 102 is between magnetometers 6 and 7, as can be seen in FIG. 3, and it can further be observed that the detected magnetic field 106 is at a maximum near the centerline 110 (more specifically, at magnetometer 7). Advantageously, the magnetometers 112 may be spaced apart by a distance of about 15 cm or less. To achieve a smaller spacing, the number of magnetometers 112 may be increased. For example, up to nine magnetometers, up to 12 magnetometers, up to 15 magnetometers, or up to 20 magnetometers may be mounted on the vehicle 102. Since using a higher number of magnetometers may reduce the spacing between the sensors, higher accuracy of position detection may be achieved. Preferably, the magnetometers 112 are mounted at a height of about 18 inches or less above the roadway 104, or at a height of about 12 inches or less above the roadway 104.

Figure 4A:
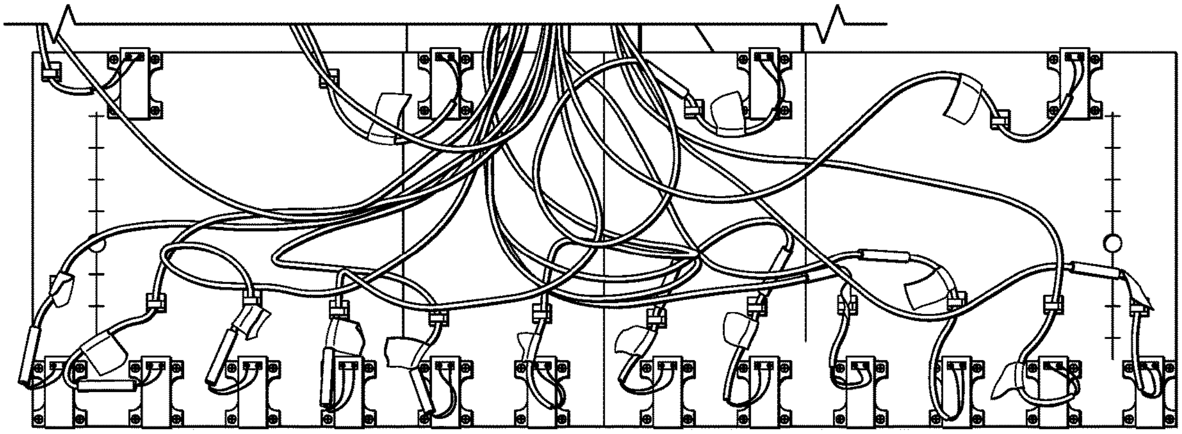
FIG. 4A shows a vehicle sensing platform including sixteen magnetometers in a gradiometer arrangement on a polycarbonate sheet.
Figure 4B:
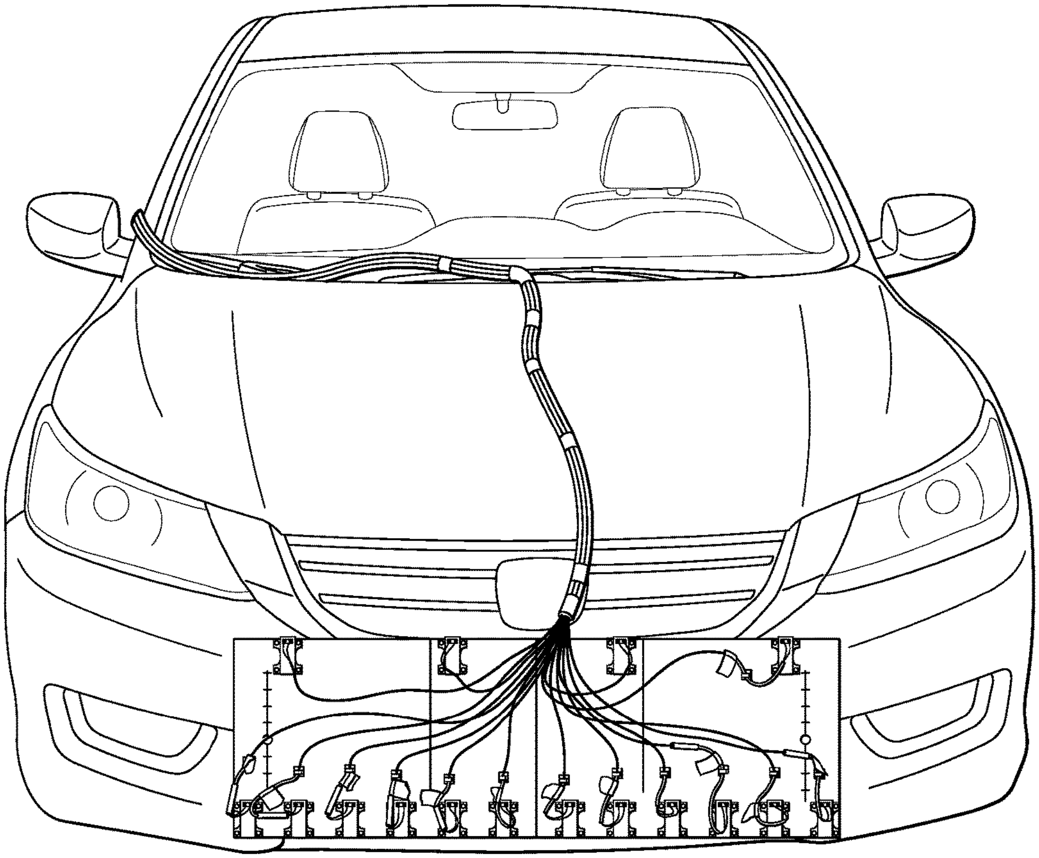
FIG. 4B shows the vehicle sensing platform of FIG. 4A mounted on a front bumper of a vehicle.

With a gradiometer arrangement of the magnetometers 112, background noise may be minimized or eliminated, which can simplify signal processing. For example, a vehicle sensing platform to detect the roadway magnetic signature was constructed by mounting sixteen magnetometers to a polycarbonate sheet, as shown in FIG. 4A, which was then mounted on a front bumper of a vehicle, as shown in FIG. 4B. The platform includes a bottom row of twelve magnetometers separated in this example by about 7.6 cm and a top row of four magnetometers. The upper four magnetometers were positioned in a gradiometer arrangement to subtract out the earth's magnetic field and other background noise from the bottom twelve magnetometers.

In some examples, the magnetometers 112 may comprise fluxgate magnetometers, giant magnetoresistance (GMR) sensors, and/or any other suitable magnetic field sensors. Fluxgate magnetometers include a soft magnetic material core that has two sets of coils (drive and sense coils)

wrapped around the core. Fluxgate action may depend on the time variation of permeability of the core. The drive coil periodically drives the core to saturation in the positive direction, out of saturation, and to saturation in the negative direction due to the excitation current. The process may follow a magnetic flux (B) versus magnetization force (H) hysteresis loop. The magnetic permeability (p) of the core material may change significantly as the core is driven into and out of saturation. When the core is unsaturated, the ambient magnetic field may be channeled through the core due to the higher magnetic permeability in the core. When the excitation current is increased and the core reaches saturation, the permeability of the core may decrease and the ambient magnetic flux may be driven out of the core, leaving only the flux from the drive coil in the core. The saturation state, where "gating" of the ambient flux occurs, yields the name of the device: fluxgate magnetometer. During this process, the sense coil measures the induced voltage caused by the inflow and outflow of the external flux as the core goes into and out of saturation. The induced voltage is proportional to the measured magnetic field.

It is also contemplated that the magnetometers 112 may comprise three-axis magnetometers that allow for detecting a magnetic field in three dimensions. Also or alternatively, the magnetic material may be magnetized in three-dimensional (3D) space to embed additional information and/or to be forward looking with respect to the vehicle instead of only downward looking. Additional information that may be embedded could include, for example, the vehicle's longitudinal position on the road or what is coming up ahead.

Generally speaking, the magnetic or magnetized material 108 incorporated into or onto the surface 104*a* of the roadway 104 may comprise an element such as iron, nickel, cobalt, chromium, gadolinium, samarium, neodymium, and/or dysprosium. In other words, the magnetic or magnetized material 108 may be a metal, alloy, compound, or composite including one or more of the above elements. For example, the magnetic or magnetized material 108 may comprise iron, steel, chromium dioxide or a cobalt-based metallic glass, such as Metglas® 2714A or $Co_{66}Fe_4Ni_1B_{14}Si_{15}$. In some examples, such as when programming and reprogramming of the location of the longitudinal segment 114 in the roadway 104 is desired, the magnetic or magnetized material 108 may have a Curie temperature below 150° C., such as in a range from about 65° C. to 149° C., or from about 65° C. to about 125° C. The Curie temperature ($T_c$) is defined as the temperature above which certain materials lose their intrinsic magnetic properties without the presence of any external magnetic field. Accordingly, in some examples the material may be demagnetized by heating above the Curie temperature and magnetized by exposure to an external magnetic field during the heating. More specifically, if an external magnetic field is applied while the temperature is above the $T_c$, a magnetic moment (both direction and strength) can be imparted to the material. In this disclosure, references to an external magnetic field are understood to refer to an applied magnetic field beyond the intrinsic magnetic field of the Earth, which is always present. As the temperature drops below the $T_c$, the induced magnetism from the external field may be imprinted as the material's intrinsic magnetic moment, or magnetization. Thus, depending on the processing history, the material may be described as a magnetizable material or as a magnetized material.

Exploiting this principle, a roadway incorporating magnetizable material, which has a $T_c$ in a suitable range for practical use, may be programmed and reprogrammed as needed to incorporate longitudinal segments comprising magnetized material at desired locations. The programming may refer to an initial magnetization applied to establish a first longitudinal segment of any length between lane lines, and reprogramming may take place in the event of road construction or another event requiring shifting of lane lines. For example, a first longitudinal segment having a predetermined location between lane lines and including magnetized material may be effectively erased (i.e., the magnetized material may be demagnetized) by local heating above the $T_c$ of the magnetized material, and a second longitudinal segment including magnetized material may be created at a new location by local heating above the $T_c$ with an external magnetic field.

Figure 5:
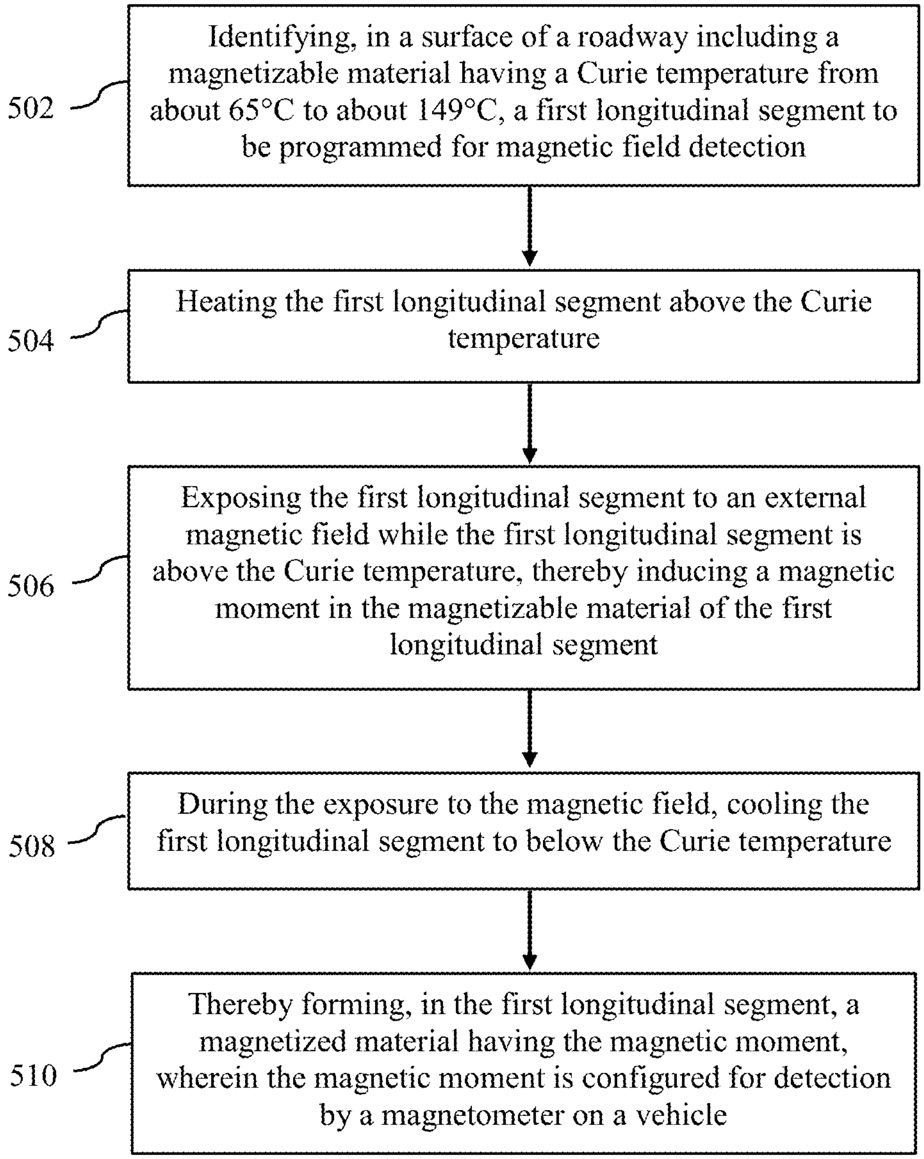
FIG. 5 is a flow chart of a method of programming a roadway for lateral lane position sensing.

Accordingly, referring to FIG. 5, a method of programming a roadway for lateral lane position sensing may include identifying 502, in a surface of a roadway including a magnetizable material having a Curie temperature from about 65° C. to 149° C., or from about 65° C. to about 125° C., a first longitudinal segment to be programmed for magnetic field detection. The first longitudinal segment may be approximately centered between lane lines on the roadway or at another desired location. The method further includes heating 504 the first longitudinal segment above the Curie temperature and exposing 506 the first longitudinal segment to an external magnetic field while the first longitudinal segment is above the Curie temperature, thereby inducing a magnetic moment in the magnetizable material of the first longitudinal segment. During the exposure to the magnetic field, the heating is ceased and the first longitudinal segment is cooled 508 to below the Curie temperature, which effectively locks in or "programs" the magnetic moment. Thus, a magnetized material having the magnetic moment is formed 510 in the first longitudinal segment. Advantageously, the magnetic moment (or magnetization) may be detected by a magnetometer on the vehicle for lateral lane position sensing.

The heating and exposure to the magnetic field may be carried out utilizing a heat source and a magnet (e.g., a permanent magnet or an electromagnet) mounted on a vehicle and transported over the first longitudinal segment at a velocity slow enough to achieve the requisite heating and magnetization. For example, a heat source such as an infrared lamp or laser directed at the first longitudinal segment may induce heating of the magnetizable material, and one or more magnets situated adjacent to and/or behind the heat source (with respect to the direction of travel of the vehicle) may provide the magnetic field exposure needed to induce a magnetic moment in the magnetizable material while heated. An external magnetic field of about 20,000 nT or greater at the surface of the roadway may be sufficient to impart the magnetization. The first longitudinal segment may then be cooled to below the Curie temperature by ceasing the heating during the exposure to the external magnetic field, followed by passive or active cooling. Passive cooling occurs by exposure to the ambient environment without any additional cooling mechanism, while active cooling entails use of a cooling method, such as forced air flow, to effect rapid cooling. The first longitudinal segment programmed in this manner to contain magnetized material typically has a width and/or depth in a range from 3-30 cm, and any desired length, where the length is determined by the distance traveled as the heat, magnetic field, and cooling are applied. Accordingly, the length of the first longitudinal segment may be as high as tens of kilometers or hundreds of kilometers, or more.

Should there be a need to change the location of the lane lines along some portion of the roadway (e.g., for roadway construction) and, consequently, the location of part or all of the longitudinal segment that includes the magnetized material, the magnetic moment imparted to the first longitudinal segment may be removed or "erased" by heating a predetermined length of the first longitudinal segment above the Curie temperature—this time without exposure to an external magnetic field—thereby demagnetizing the magnetized material over the predetermined length. The heating may be carried out by exposure to infrared light as described above.

In such a situation, the method may further include identifying a second longitudinal segment of the roadway to be programmed for magnetic field detection, where, as before, the surface of the roadway includes the magnetizable material. Once identified, the second longitudinal segment of the roadway may be heated above the Curie temperature and exposed to an external magnetic field while above the Curie temperature, thereby inducing a predetermined magnetic moment in the magnetizable material of the second longitudinal segment. During the exposure to the magnetic field, the second longitudinal segment may be cooled to below the Curie temperature, which effectively locks in or programs the magnetic moment. Thus, a magnetized material having the magnetic moment is formed in the second longitudinal segment. Advantageously, the magnetic moment or magnetization may be detected by a magnetometer on the vehicle for lateral lane position sensing.

The heating and exposure to the magnetic field may be carried out as described above for the programming of the first longitudinal segment. That is, a heat source and magnet (e.g., a permanent magnet or an electromagnet) positioned on a vehicle and transported over the second longitudinal segment at a velocity to slow enough to achieve the requisite heating and magnetization may be employed. In one example, a heat source such as an infrared lamp or laser directed at the second longitudinal segment may induce heating of the magnetizable material, and one or more magnets situated adjacent to and/or behind the heat source (with respect to the direction of travel of the vehicle) may provide the magnetic field exposure needed to induce a magnetic moment in the magnetizable material while heated. An external magnetic field of about 10,000 nT or greater at the surface of the roadway, or about 20,000 nT or greater at the surface of the roadway, may be sufficient to impart the magnetization. Other external magnetic fields (e.g., up to or greater than 100,000 nT at the surface of the roadway) may also be suitable. The second longitudinal segment may then be cooled to below the Curie temperature by ceasing the heating during the exposure to the external magnetic field, followed by passive or active cooling. The second longitudinal segment programmed in this manner to contain magnetized material typically has a width and/or depth in a range from 3-30 cm, and any desired length, where the length is determined by the distance traveled as the heat, magnetic field and cooling are applied. Accordingly, the length of the second longitudinal segment extend for up to tens of kilometers or hundreds of kilometers, or more.

As described above for the first longitudinal segment, should there be a need to change the location of the lane lines along some portion of the roadway and, consequently, the location of part or all of the second longitudinal segment that includes the magnetized material, the magnetic moment imparted to the second longitudinal segment may be removed or erased by heating a predetermined length of the second longitudinal segment above the Curie temperature—this time without exposure to an external magnetic field—thereby demagnetizing the magnetized material over the predetermined length. The above-described process of programming, erasing, and reprogramming may be repeated as needed.

Prior to programming and/or utilizing a roadway for lateral lane position sensing, the roadway may be constructed or repaved to incorporate the magnetic or magnetizable material into or onto the surface. The construction or repaving process may entail coating the magnetic or magnetizable material onto a surface of an uncured paving material and/or embedding the magnetic or magnetizable material into the surface of the uncured paving material, followed by curing and/or drying. In one example, a paving material product comprising a mixture of a magnetic or magnetizable material and an uncured paving material may be sprayed on or otherwise applied to an existing roadway or to a roadway under construction. The uncured paving material may comprise an asphalt emulsion, asphalt concrete, or concrete, and the magnetic or magnetizable material may have any of the characteristics described in this disclosure. Curing and/or drying of the uncured paving material may be carried out as known in the art. It is understood that the magnetic or magnetizable material is confined to the surface of the roadway, e.g., is incorporated onto the roadway or into the roadway to a depth no greater than 3-30 cm. Part or all of the surface of the roadway may include the magnetic or magnetizable material.

Proof-of-Concept Experiment

To evaluate the viability of programming, erasing, and reprogramming a magnetic signature in a roadway, a concrete sample including $CrO_2$ particles embedded in the surface was fabricated and tested. $CrO_2$ has a relatively low Curie temperature ($T_c$) of 120° C. and thus may be magnetized by heating above the $T_c$ and cooling in the presence of a permanent magnet under practical conditions, as described above.

Figure 6:
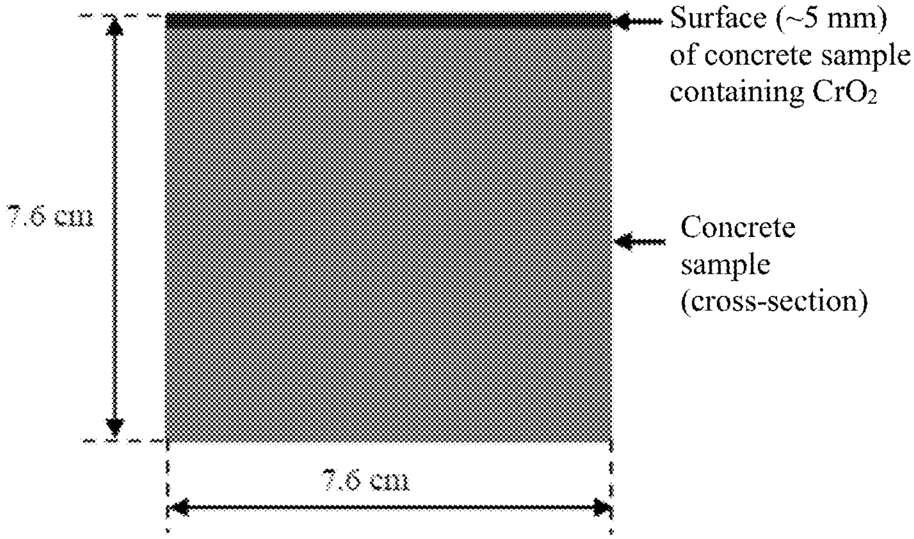
FIG. 6 is a cross-sectional schematic of a concrete sample including $CrO_2$ powder embedded in the top surface.

To form the concrete sample, which is illustrated in the cross-sectional schematic of FIG. 6, $CrO_2$ powder was introduced to the surface of fresh (uncured) concrete and incorporated into the hardened material microstructure. In particular, a 7.6 cm by 7.6 cm by 45.7 cm (3 in by 3 in by 18 in) concrete sample was cast, and approximately 50 grams (0.11 lb) of chromium dioxide powder was sprayed on the surface of the uncured concrete. The $CrO_2$ powder had a mean particle size of 44 microns. After distributing the $CrO_2$ powder on the surface, the freshly molded concrete sample was externally vibrated. The $CrO_2$ powder was embedded in approximately the top 5 mm of the concrete sample, which corresponds to a concentration of about 6 vol. %. The concrete sample containing $CrO_2$ particles embedded in the surface was subsequently cured for seven days prior to heat treatment and testing. For magnetic field testing, the concrete sample was inserted into a concrete slab including a notch sized to fit the concrete sample, as illustrated by the inset schematics of FIGS. 9-12, which are not to scale.

Figure 7:
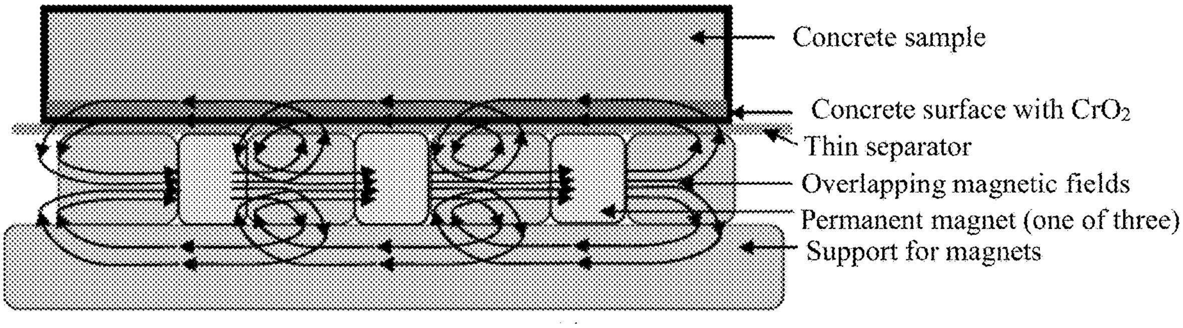
FIG. 7 shows a magnet configuration designed to impart a magnetic moment to the embedded $CrO_2$ particles of the concrete sample of FIG. 6 when the concrete surface is heated above the Curie temperature ($T_c$) of $CrO_2$.
Figure 8:
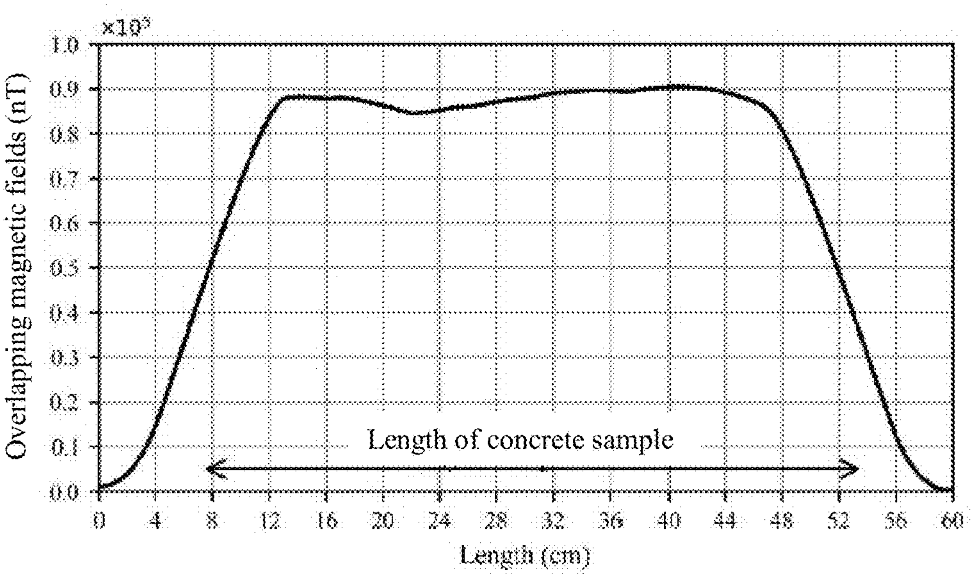
FIG. 8 shows the overlapping magnetic fields created by the three permanent magnets in the exemplary set-up of FIG. 7, where background noise has been removed.

The magnetic field from the concrete sample was detected under four test conditions: (1) prior to magnetization of the $CrO_2$; (2) after heating the concrete sample above the $T_c$ and cooling with the $CrO_2$ surface facing the overlapping magnetic fields of three permanent magnets (see FIGS. 7 and 8) to induce a magnetic moment in the $CrO_2$; (3) after "erasing" the magnetic moment by heating the concrete sample above the $T_c$ and cooling without exposure to an external magnetic field; and (4) after heating the concrete sample above the $T_c$ and cooling with the $CrO_2$ surface perpendicular to the external magnetic field, to induce a second (different) magnetic moment in the $CrO_2$.

Figure 9:
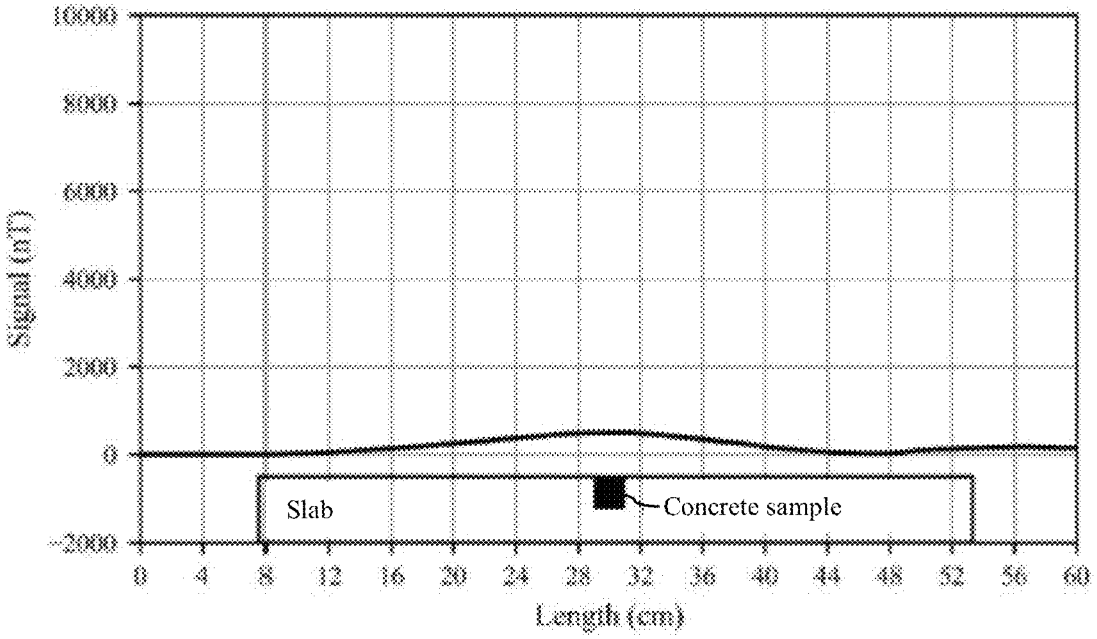
FIG. 9 shows the net magnetic field detected from a slab containing the concrete sample of FIG. 6 prior to magnetization of the $CrO_2$.
Figure 10:
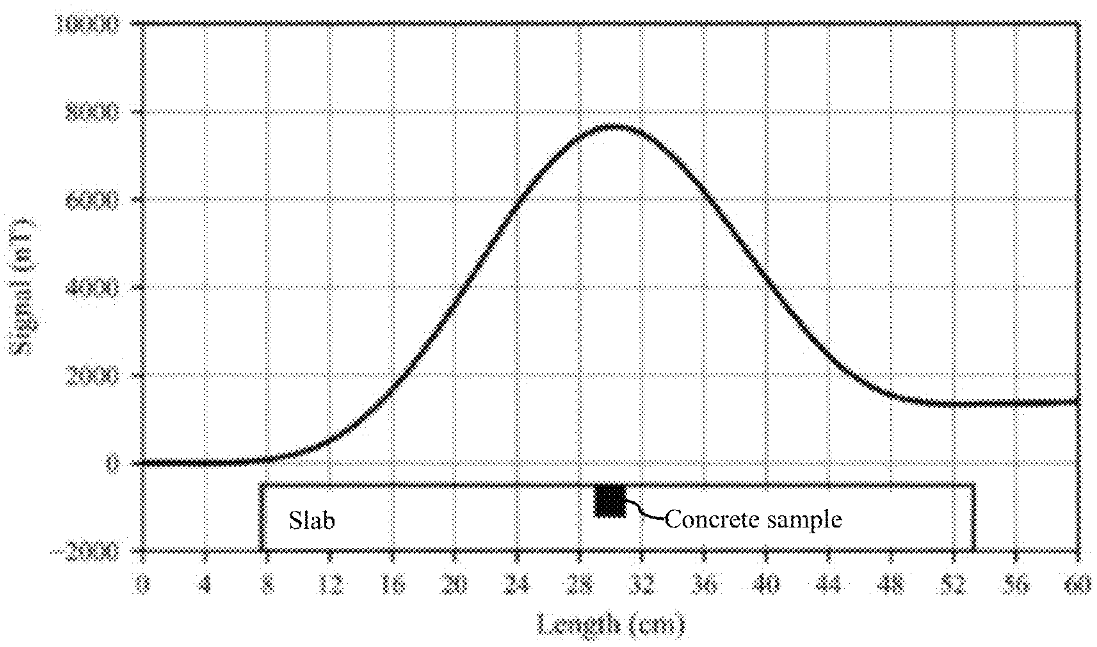
FIG. 10 shows the net magnetic field detected from a slab containing the concrete sample of FIG. 6 after magnetization of the $CrO_2$ with the top surface of facing the magnets.
Figure 11:
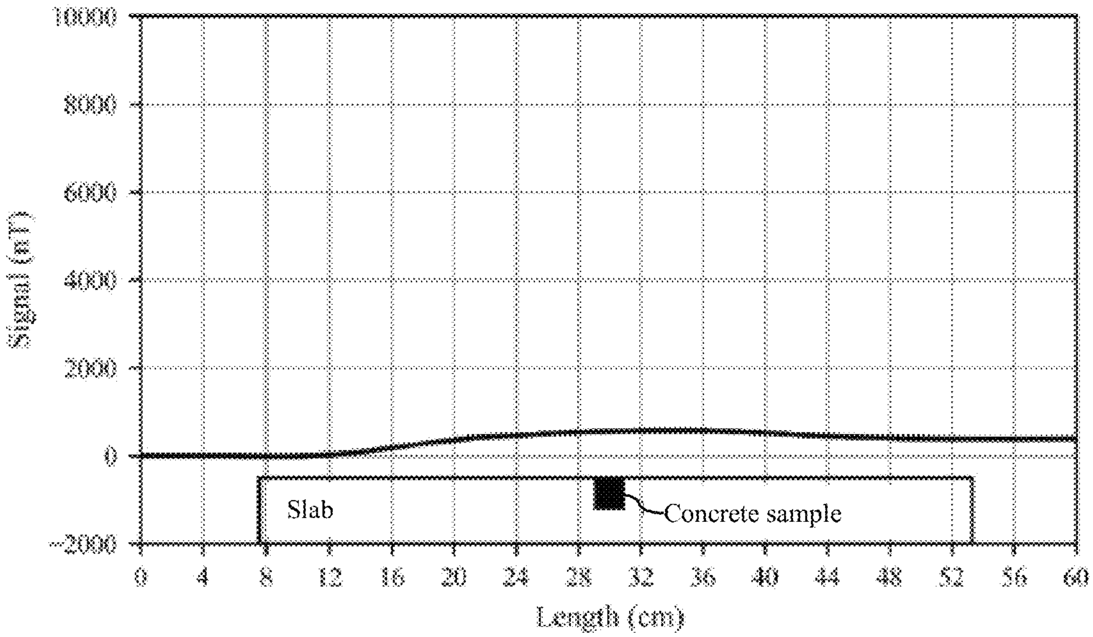
FIG. 11 shows the net magnetic field detected from a slab containing the concrete sample of FIG. 6 after demagnetization of the $CrO_2$.
Figure 12:
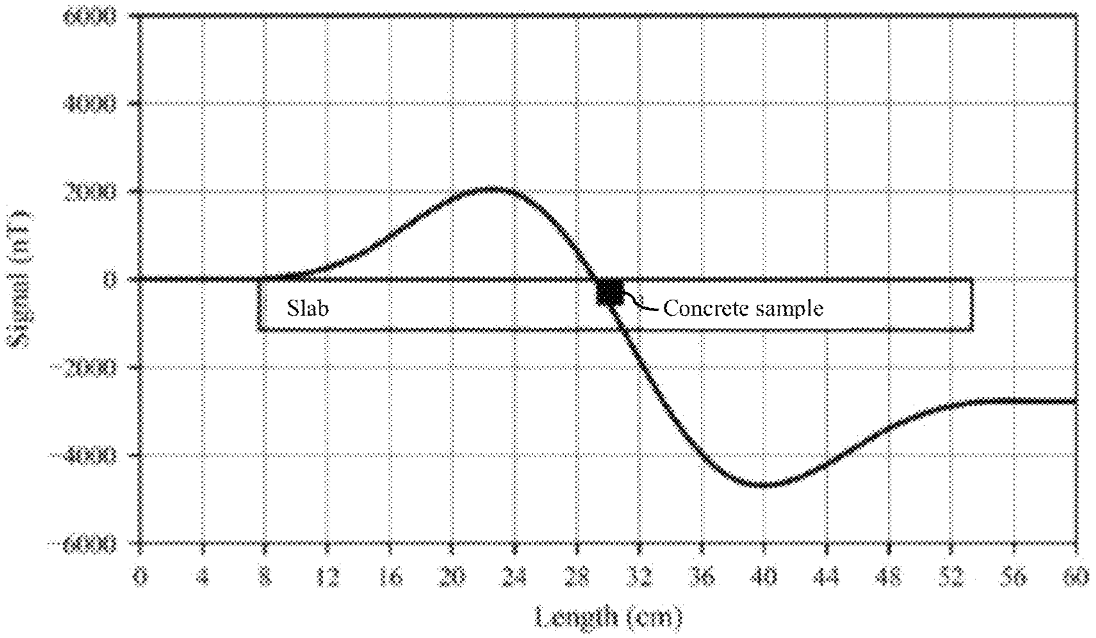
FIG. 12 shows the net magnetic field detected from the slab containing the concrete sample of FIG. 6 after re-magnetization of the $CrO_2$ with the top surface perpendicular to the magnets.

The first condition tested, where a magnetic signal was obtained from the slab/concrete sample prior to magnetization of the $CrO_2$, resulted in a detected magnetic field of a few hundred nanotesla, as shown by the data of FIG. 9. Under the second condition, the magnetic signal strength obtained was much stronger (almost 8000 nT), as shown by the data of FIG. 10, and also four times higher than the magnetic signal from an analogous concrete sample containing 1 vol. % steel fibers embedded in the surface. Under the third condition, a very small magnetic signal was detected, as shown by the data of FIG. 10. Under the fourth condition, a high magnetic signal (absolute peak slightly less than 5000 nT) was observed, as shown by the data of FIG. 11, which differed in pattern and magnitude from the first magnetic signal. This proof-of-concept demonstration supports the idea that a programmable, erasable, and reprogrammable magnetic field may be created on or in a roadway surface, thereby allowing infrastructure owners to modify the magnetic signature after construction to accommodate lane shifting requirements, such as in a construction zone.

The subject matter of this disclosure may also relate to the following aspects:

A first aspect relates to a method of maintaining lateral lane position of a vehicle traveling on a roadway, the method comprising: detecting a magnetic field from a surface of the roadway, the surface including a magnetic or magnetized material; and adjusting a lateral position of the vehicle on the roadway such that the magnetic field has a maximum at a predetermined location on the vehicle, e.g., at or near a centerline of the vehicle.

A second aspect relates to the method of the preceding aspect, wherein the magnetic or magnetized material is localized to a longitudinal segment of the surface approximately centered between lane lines.

A third aspect relates to the method of any preceding aspect, wherein the detection of the magnetic field takes place continuously.

A fourth aspect relates to the method of any preceding aspect, wherein the magnetic or magnetized material is embedded into and/or coated onto the surface of the roadway.

A fifth aspect relates to the method of any preceding aspect, wherein the magnetic field is detected by three or more magnetometers positioned on the vehicle.

A sixth aspect relates to the method of the preceding aspect, wherein the three or more magnetometers are positioned along a line or curve transverse to a centerline of the vehicle.

A seventh aspect relates to the method of the fifth or sixth aspect, wherein the three or more magnetometers are positioned at a height of about 18 inches or less above the roadway, or at a height of about 12 inches or less above the roadway.

An eighth aspect relates to the method of any of the fifth through the seventh aspects, wherein the three or more magnetometers are arranged on a front bumper of the vehicle, a rear bumper of the vehicle, or an undercarriage of the vehicle.

A ninth aspect relates to the method of any one of the fifth through the eighth aspects, wherein the three or more magnetometers include fluxgate magnetometers, giant magnetoresistance (GMR) sensors, and/or any other suitable magnetic field sensors.

A tenth aspect relates to the method of any preceding claim, wherein the magnetic field is detected by up to nine magnetometers, up to 12 magnetometers, up to 15 magnetometers, or up to 20 magnetometers positioned on the vehicle.

An eleventh aspect relates to the method of any preceding claim, wherein the roadway is partially or fully covered by water, snow, ice, sand, and/or mud.

A twelfth aspect relates to the method of any preceding claim, wherein the magnetic or magnetized material has a morphology of particles, fibers, or ribbon(s).

A thirteenth aspect relates to the method of the preceding claim, wherein the particles, fibers, or ribbon(s) have a linear dimension in a range from a few microns to tens of millimeters.

A fourteenth aspect relates to the method of any preceding claim, wherein the magnetic or magnetized material has a concentration in the surface ranging from about 0.25 vol. % to about 10 vol. %.

A fifteenth aspect relates to the method of any preceding claim, wherein the magnetic or magnetized material has a Curie temperature in a range from about 65° C. to about 125° C.

A sixteenth aspect relates to the method of any preceding claim, wherein the magnetic or magnetized material comprises an element selected from the group consisting of: iron, nickel, cobalt, chromium, gadolinium, samarium, neodymium, and dysprosium.

A seventeenth aspect relates to the method of any preceding claim, wherein the magnetic or magnetized material comprises chromium dioxide or a cobalt-based metallic glass.

An eighteenth aspect relates to a paving material product for roadway construction or repair, the paving material product comprising: a mixture including: a magnetic or magnetizable material; and an uncured paving material.

A nineteenth aspect relates to the paving material product of the preceding claim, wherein the uncured paving material comprises an asphalt concrete, concrete, or an asphalt emulsion.

A twentieth aspect relates to the paving material product of any preceding claim, wherein the magnetic or magnetizable material has a morphology of particles, fibers, or ribbon(s).

A twenty-first aspect relates to the paving material product of the preceding claim, wherein the particles, fibers, or ribbon(s) have a linear dimension a range from a few microns to tens of millimeters.

A twenty-second aspect relates to the paving material product of any preceding claim, wherein the magnetic or magnetizable material has a Curie temperature in a range from about 65° C. to about 149° C.

A twenty-third aspect relates to the paving material product of any preceding claim, wherein the magnetic or magnetizable material comprises an element selected from the group consisting of: iron, nickel, cobalt, chromium, gadolinium, samarium, neodymium, and dysprosium.

A twenty-fourth aspect relates to the paving material product of any preceding claim, wherein the magnetic or magnetizable material comprises chromium dioxide or a cobalt-based metallic glass.

A twenty-fifth aspect relates to the paving material product of any preceding claim, wherein the magnetic or magnetizable material is present in the mixture at a concentration ranging from 0.25 vol. % to about 10 vol. %.

A twenty-sixth aspect relates to a method of programming a roadway for lateral lane position sensing, the method comprising: identifying, in a surface of a roadway including a magnetizable material having a Curie temperature from about 65° C. to about 149° C., a first longitudinal segment to be programmed for magnetic field detection; heating the first longitudinal segment above the Curie temperature; exposing the first longitudinal segment to an external magnetic field while the first longitudinal segment is above the Curie temperature, thereby inducing a magnetic moment in the magnetizable material of the first longitudinal segment; during the exposure to the magnetic field, cooling the first longitudinal segment to below the Curie temperature, thereby forming, in the first longitudinal segment, a magnetized material having the magnetic moment, wherein the magnetic moment is configured for detection by a magnetometer on a vehicle.

A twenty-seventh aspect relates to the method of the preceding aspect, wherein the first longitudinal segment is approximately centered between lane lines on the roadway.

A twenty-eighth aspect relates to the method of the twenty-sixth or the twenty-seventh aspect, wherein the heating above the Curie temperature is affected by infrared light from an infrared lamp or laser.

A twenty-ninth aspect relates to the method of any of the twenty-sixth through the twenty-eighth aspects, wherein the heating above the Curie temperature and the exposure to the external magnetic field are carried out utilizing a heat source and one or more magnets mounted on a vehicle and transported over the first longitudinal segment.

A thirtieth aspect relates to the method of any of the twenty-sixth through the twenty-ninth aspects, wherein the external magnetic field is at least about 20,000 nT at the surface of the roadway.

A thirty-first aspect relates to the method of any of the twenty-sixth through the thirtieth aspects, wherein cooling the first longitudinal segment to below the Curie temperature comprises ceasing the heating, the cooling occurring passively.

A thirty-second aspect relates to the method of any of the twenty-sixth through the thirty-first aspects, wherein the cooling the first longitudinal segment to below the Curie temperature comprises ceasing the heating and then actively cooling the first longitudinal segment.

A thirty-third aspect relates to the method of any of the twenty-sixth through the thirty-second aspects, further comprising, prior to identifying the first longitudinal segment, constructing the roadway to include the magnetizable material, the constructing comprising: coating the magnetizable material onto a surface of an uncured paving material and/or embedding the magnetizable material into the surface of the uncured paving material, and curing and/or drying the uncured paving material.

A thirty-fourth aspect relates to the method of any of the twenty-sixth through the thirty-third aspects, wherein part or all of the surface includes the magnetizable material.

A thirty-fifth aspect relates to the method of any of the twenty-sixth through the thirty-fourth aspects, further comprising removing the magnetic moment of the first longitudinal segment by heating the first longitudinal segment above the Curie temperature.

A thirty-sixth aspect relates to the method of the preceding aspect, further comprising identifying a second longitudinal segment of the roadway to be programmed for magnetic field detection; heating the second longitudinal segment of the roadway above the Curie temperature; exposing the second longitudinal segment of the roadway to the external magnetic field while the second longitudinal segment is above the Curie temperature, thereby inducing a magnetic moment in the magnetizable material of the second longitudinal segment; and during the exposure to the magnetic field, cooling the second longitudinal segment to below the Curie temperature, thereby forming, in the second longitudinal segment, a magnetized material having the magnetic moment, wherein the magnetic moment is configured for detection by a magnetometer on a vehicle.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A method of maintaining lateral lane position of a vehicle traveling on a roadway, the method comprising:

detecting a magnetic field from a surface of the roadway, the surface including a magnetic or magnetized material localized to a longitudinal segment approximately centered between lane lines and extending continuously along a length of the roadway, the magnetic or magnetized material comprising particles, fibers and/or ribbon(s) distributed throughout a length of the longitudinal section; and adjusting a lateral position of the vehicle on the roadway during travel such that a maximum magnetic field signal is detected by three or more magnetometers positioned on the vehicle, wherein the magnetometers are arranged in a top row and a bottom row transverse to a centerline of the vehicle.

2. The method of claim 1, wherein the detection of the magnetic field takes place continuously.

3. The method of claim 1, wherein the magnetic or magnetized material is embedded into and/or coated onto the surface of the roadway.

4. The method of claim 1, wherein the magnetic field is detected when the surface of the roadway is partially or fully covered by water, snow, ice, sand, and/or mud.

5. The method of claim 1, wherein the magnetic or magnetized material is embedded into the surface of the roadway and has a concentration in the surface ranging from about 0.25 vol. % to about 10 vol. %.

6. The method of claim 1, wherein the magnetic or magnetized material has a Curie temperature in a range from about 65° C. to about 149° C.

7. The method of claim 1, wherein the particles, fibers, or ribbon(s) have a linear dimension in a range from a few microns to tens of millimeters.

8. The method of claim 1, wherein the magnetic or magnetized material comprises an element selected from the group consisting of iron, nickel, cobalt, chromium, gadolinium, samarium, neodymium, and dysprosium.

9. The method of claim 1, wherein the magnetic or magnetized material comprises chromium dioxide or a cobalt-based metallic glass.

10. The method of claim 1, wherein the magnetometers arranged in each of the top row and the bottom row transverse to the centerline of the vehicle are positioned along a line or curve.

11. The method of claim 1, wherein the three or more magnetometers include fluxgate magnetometers and/or giant magnetoresistance (GMR) sensors.

* * * * *